United States Patent
Gewax et al.

(10) Patent No.: US 12,236,177 B2
(45) Date of Patent: Feb. 25, 2025

(54) CIRCUIT DESIGN VALIDATION TOOL FOR RADIATION-HARDENED DESIGN

(71) Applicant: TEXAS INSTRUMENTS INCORPORATED, Dallas, TX (US)

(72) Inventors: Lawrence James Gewax, Dallas, TX (US); Timothy Paul Duryea, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 458 days.

(21) Appl. No.: 17/586,516

(22) Filed: Jan. 27, 2022

(65) Prior Publication Data
US 2022/0245314 A1  Aug. 4, 2022

Related U.S. Application Data

(60) Provisional application No. 63/143,212, filed on Jan. 29, 2021.

(51) Int. Cl.
*G06F 30/33* (2020.01)
*G06F 30/327* (2020.01)
*G06F 30/367* (2020.01)
*G06F 30/398* (2020.01)
*G06F 119/02* (2020.01)

(52) U.S. Cl.
CPC ............ *G06F 30/33* (2020.01); *G06F 30/327* (2020.01); *G06F 30/367* (2020.01); *G06F 30/398* (2020.01); *G06F 2119/02* (2020.01)

(58) Field of Classification Search
CPC ............................... G06F 30/33; G06F 30/327
USPC ............... 716/103, 104, 106, 111, 112, 136; 703/14; 714/732, 714
See application file for complete search history.

(56) References Cited

U.S. PATENT DOCUMENTS

| | | | |
|---|---|---|---|
| 5,867,399 A | 2/1999 | Rostoker et al. | |
| 6,009,251 A * | 12/1999 | Ho | G06F 30/398 716/112 |
| 8,739,092 B1 * | 5/2014 | Ben-Tzur | G06F 30/3323 716/108 |
| 9,460,252 B1 * | 10/2016 | Ben-Tzur | G06F 30/33 |
| 2003/0009727 A1 | 1/2003 | Takeyama et al. | |
| 2006/0090144 A1 * | 4/2006 | Lakshmanan | G06F 30/398 716/112 |

(Continued)

OTHER PUBLICATIONS

International search report dated May 12, 2022.

*Primary Examiner* — Phallaka Kik
(74) *Attorney, Agent, or Firm* — Ronald O. Neerings; Frank D. Cimino

(57) ABSTRACT

One example includes a method for validating a circuit design. The method includes providing a set of coded rules. Each of the coded rules can define conditions for circuit cells to qualify the circuit design as being radiation-hardened. The method also includes accessing a circuit design netlist associated with the circuit design from a circuit design database. The method also includes evaluating each of the circuit cells in the circuit design netlist with respect to each of the coded rules. The method further includes providing a circuit evaluation report comprising an indication of failure of a set of the circuit cells with respect to one or more of the coded rules in response to the evaluation.

20 Claims, 4 Drawing Sheets

(56) References Cited

U.S. PATENT DOCUMENTS

2006/0095883 A1\* 5/2006 Lakshmanan ......... G06F 30/398
 716/112
2014/0137058 A1\* 5/2014 Alam ...................... G06F 30/30
 716/107

\* cited by examiner

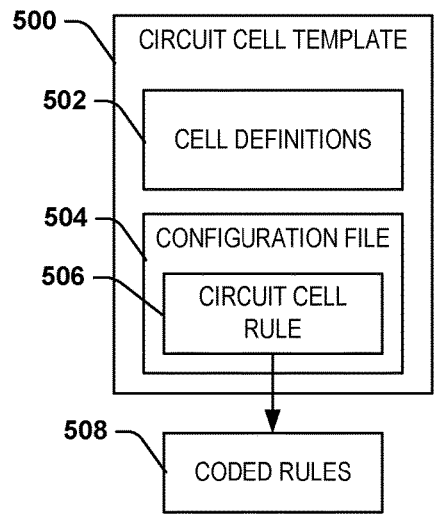

FIG. 5

| | | CIRCUIT VALIDATION REPORT | | |
|---|---|---|---|---|
| 1 | FAILURE → CELL A | RULE A | FAILURE REASON | EVALUATE FAILURE |
| 2 | FAILURE → CELL G | RULE A | FAILURE REASON | EVALUATE FAILURE |
| 3 | FAILURE → CELL H | RULE B | FAILURE REASON | EVALUATE FAILURE |
| 4 | FAILURE → CELL K | RULE B | FAILURE REASON | EVALUATE FAILURE |
| 5 | FAILURE → CELL X | RULE C | FAILURE REASON | EVALUATE FAILURE |
| ⋮ | | | | |
| N | FAILURE → CELL AB | RULE J | FAILURE REASON | EVALUATE FAILURE |

FIG. 6

CIRCUIT DESIGN VALIDATION TOOL FOR RADIATION-HARDENED DESIGN

CROSS REFERENCE TO RELATED APPLICATION

This application claims priority to U.S. Provisional Patent Application No. 63/143,212, filed 29 Jan. 2021, which is incorporated herein by reference in its entirety.

TECHNICAL FIELD

This description relates generally to software systems, and more particularly to a circuit design validation tool for radiation-hardened design.

BACKGROUND

Circuit design software-implemented tools can assist users to design circuits based on providing inputs corresponding to circuit components, desired behavior, and constraints in an interactive or batch manner. Such design tools can be implemented to design very complicated circuits that can ultimately be fabricated into integrated circuits that can be packaged into chips. Such integrated circuits can be implemented in a variety of different applications. Some circuit designs require particular constraints that can require additional componentry, connections, or other considerations that can add considerable complexity to a given circuit. As one example, a circuit that is designed to be radiation-hardened can include additional constraints that facilitate operation of the circuit in certain environmental conditions (e.g., in aerospace applications). For example, one requirement of radiation-hardened circuits is that circuit components be triple-redundant to mitigate damage and/or errors resulting from high-energy particles. Such additional constraints can provide significant additional complexity to circuit design, and can sometimes require costly and time-consuming testing protocols.

SUMMARY

One example includes a method for validating a circuit design. The method includes providing a set of coded rules. Each of the coded rules can define conditions for circuit cells to qualify the circuit design as being radiation-hardened. The method also includes accessing a circuit design netlist associated with the circuit design from a circuit design database. The method also includes evaluating each of the circuit cells in the circuit design netlist with respect to each of the coded rules. The method further includes providing a circuit evaluation report comprising an indication of failure of a set of the circuit cells with respect to one or more of the coded rules in response to the evaluation.

Another example described herein includes a circuit validation system. The system includes a user interface configured to facilitate input of a set of coded rules. Each of the coded rules can define conditions for circuit cells to qualify the circuit design as being radiation-hardened. The system also includes a circuit database application programming interface (API) configured to provide access to a circuit design netlist associated with the circuit design from a circuit design database. The system further includes a circuit design validation tool configured to access the circuit design netlist via the circuit database API and to evaluate each of the circuit cells in the circuit design netlist with respect to each of the coded rules and to provide a circuit evaluation report to a validation database on the user interface. The circuit evaluation report can include an indication of failure of a set of the circuit cells with respect to one or more of the coded rules in response to the evaluation.

Another example described herein includes a circuit design validation tool. The circuit design validation tool is configured to receive a set of coded rules. Each of the coded rules can define conditions for circuit cells to qualify the circuit design as being radiation-hardened. The circuit design validation tool can also be configured to access a circuit design netlist associated with the circuit design via a circuit database API associated with a circuit design database. The circuit design validation tool can also be configured to evaluate each of the circuit cells in the circuit design netlist with respect to each of the coded rules. The circuit design validation tool can further be configured to provide a circuit evaluation report to a validation database on the user interface, the circuit evaluation report comprising an indication of failure of a set of the circuit cells with respect to one or more of the coded rules in response to the evaluation.

BRIEF DESCRIPTION OF THE DRAWINGS

FIG. 5 is an example diagram of a circuit cell template.
FIG. 6 is an example diagram of a circuit evaluation report.

DETAILED DESCRIPTION

Figure 1:
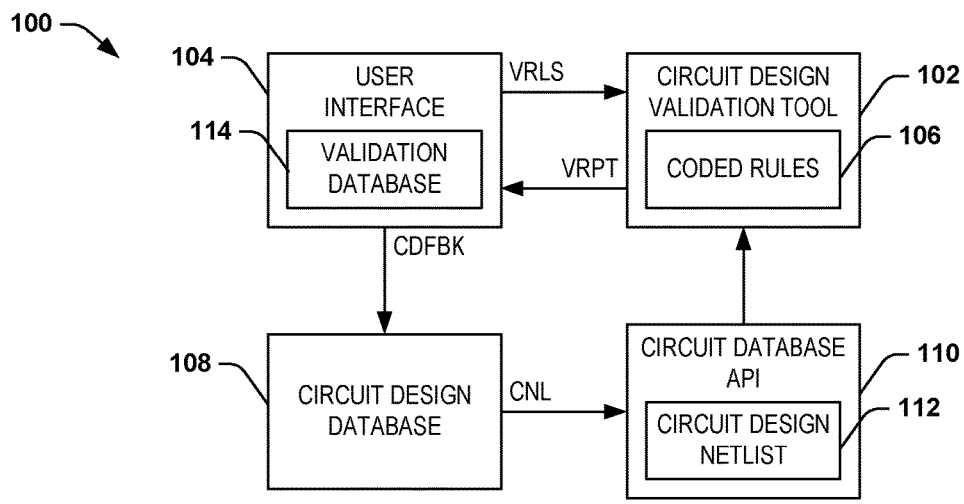
FIG. 1 is an example diagram of a circuit validation system.

This description relates generally to software systems, and more particularly to a circuit design validation tool for radiation-hardened design. The circuit design validation tool can be implemented in a circuit design validation system that is configured to validate a circuit design based on a set of coded rules. The coded rules can be created to satisfy a set of criteria and/or constraints associated with the circuit design. As described herein, the term "coded rules" refers to a set of defined rules that can be provided as software files, data elements (e.g., in a database), or any other type of data for use by the circuit design validation tool. For example, the coded rules are used to ensure that a circuit design meets the criteria for satisfying a radiation-hardened design. As described herein, the term "radiation-hardened" refers to design considerations that render a resultant fabricated circuit as resistant to damage or malfunction caused by high levels of ionizing radiation (e.g., particle radiation and/or high-energy electromagnetic radiation), such as for circuit applications in space. Therefore, the circuit design validation tool can evaluate the circuit design based on the coded rules to determine if the circuit design meets the criteria defined by the coded rules.

The circuit design validation system, which includes the circuit design validation tool, can also include a user interface to enable inputs to program the coded rules for use by the circuit design validation tool. As an example, the coded rules are provided as software files or routines accessible and implemented by the software program associated with the circuit design validation tool 102. The user interface can also include a validation database to which the circuit design validation tool can provide a circuit evaluation report that indicates failure of circuit cells with respect to the evaluation of the circuit design based on one or more of the coded rules. As described herein, the term "circuit cell" describes a functional block of one or more circuit components that collectively implement a circuit function within the circuit design. As described herein, at a lowest level of hierarchical layers, a circuit cell can correspond to a single circuit element (e.g., a transistor, resistor, capacitor, etc.), and at higher levels of hierarchical layers, can correspond to a set of smaller circuit cells that can each collectively correspond to a very large quantity of circuit elements. As described herein, the circuit cells can be evaluated by the circuit design validation tool with respect to the coded rules to determine if the circuit cells pass the coded rules or fail the coded rules.

The circuit design validation tool can be configured to access a circuit design netlist associated with the circuit design from a circuit design database (e.g., associated with a circuit design tool) via a circuit database application programming interface (API). The circuit design validation tool can thus evaluate each of the circuit cells based on a sequential application of the coded rules. As an example, circuit design validation tool is configured to evaluate the hierarchical layers of the circuit design in a sequence. Upon evaluation of the entire circuit design, the circuit design validation tool can provide the circuit evaluation report to indicate a list of circuit cells that failed specific coded rules. For example, the user interface includes a evaluate failure input that can provide correction of the respective failed circuit cells (e.g., based on a user input). For example, the evaluate failure input modifies a circuit cell in the circuit design netlist that was indicated as failed in the circuit evaluation report to change the respective circuit cell to allow the circuit cell to pass the respective coded rule.

The coded rules can be associated with a variety of operational, structural, and/or behavioral characteristics of the circuit cells. As a first example, the circuit design validation tool is configured evaluate each instance of a circuit cell corresponding to each of a plurality of circuit cell templates stored in a circuit design library with respect to one or more of the coded rules. In this example, the circuit cell templates can include cell definitions that define operational, structural, and intended behavioral characteristics of the type of the circuit cells. Therefore, the coded rules can correspond to rules defining consistency between a respective one of the circuit cell templates and each instance of the respective circuit cell with respect to the cell definitions. As a second example, the circuit design validation tool is configured to evaluate each of the instances of each of the circuit cell types with respect one or more additional coded rules. In this example, the instances can include a unique instance name, net names associated with input and output wire couplings associated with the respective instances, and connections of the wire couplings to other instances of other circuit cells. Therefore, the coded rules can define standards associated with the instance name, the net names, and the connections for each of the instances of the given cell type.

The circuit design validation tool can thus be implemented to provide a high degree of scrutiny of a circuit design to satisfy the desired criteria as established by the coded rules. Such a validation process can provide a significantly more accurate and more rapid review of a circuit design relative to manual review by a circuit designer. Thus, the circuit design validation tool can mitigate human error that can result from time consuming and tedious manual review. Furthermore, in some examples, the circuit design validation tool can obviate the need for manual circuit validation that simulates environmental conditions. For example, for validation of a radiation-hardened circuit design, the circuit design validation tool can provide sufficient validation of the radiation-hardened design instead of providing particle accelerator testing that can be costly and not readily accessible.

FIG. 1 is an example diagram of a circuit design validation system 100. The circuit design validation system 100 includes a circuit design validation tool 102 that is configured to validate a circuit design to satisfy a set of predefined criteria, as described herein. The circuit design validation tool 102 can correspond to a software program that can be implemented on a computer, or can be implemented on a dedicated terminal or set of hardware (e.g., including one or more processors, memory, etc.). For example, the circuit design validation tool 102 can be implemented as one or more application specific integrated circuits (ASICs), field-programmable gate arrays, or processors. Therefore, the circuit design validation tool 102 can be implemented as software, hardware, firmware, or a combination thereof.

The circuit design validation system 100 includes a user interface 104 that can facilitate inputs from and outputs to a user. The user interface 104 can be configured to program a set of coded rules that are provided to the circuit design validation tool 102, demonstrated in the example of FIG. 1 as validation rule-set data "VRLS" provided from the user interface 104 to the circuit design validation tool 102. In the example of FIG. 1, the coded rules VRLS are stored as coded rules 106, such as software routines, extensions, files, etc. that are used by the circuit design validation tool 102. The coded rules 106 can be stored in a memory or a database associated with the circuit design validation tool 102, or can be stored on a memory associated with the user interface 104. The coded rules 106 can correspond to a set of desired criteria and/or constraints associated with defining considerations and constraints for ensuring that the circuit design qualifies as radiation-hardened. For example, the coded rules can be associated with ensuring the circuit cells in the circuit design exhibit a triple-redundant with majority vote topology, among other possible requirements to satisfy a radiation-hardened design. As described herein, the term "triple-redundant" refers to a set of three identical components that each provide an output to a majority-voting block that provides a single output to ensure consistency of the outputs of the identical components.

In the example of FIG. 1, the circuit design validation system 100 includes a circuit design database 108 that is configured to store the circuit design. As an example, the circuit design can be generated via a circuit design tool (e.g., a software design tool), such that the completed circuit design can be stored in the circuit design database 108. The circuit design validation system 100 also includes a circuit database application programming interface (API) 110 that can facilitate access by the circuit design validation tool 102 to a circuit design netlist 112 corresponding to the circuit design stored in the circuit design database 108. For example, the circuit design netlist 112 can be provided from the circuit design database 108 as circuit netlist data, shown as "CNL" in FIG. 1, which is representative of the access of the circuit design netlist 112 from the circuit design database 108 via the circuit database API 110. As an example, the circuit database API 110 can be an Open Access (OA) API that is accessible by any of a variety of software platforms. Therefore, the circuit database API 110 can allow the circuit design validation tool 102 to access the circuit design netlist 112 for evaluation.

The circuit design validation tool 102 can evaluate the circuit design netlist 112 to determine if circuit cells associated with the circuit design satisfy the coded rules 106. The circuit design validation tool 102 can thus determine if each of a plurality of circuit cells in each of a plurality of hierarchical layers of the circuit design satisfy the predetermined criteria and/or constraints defined by the coded rules 106, thereby passing the respective coded rules, or if any of the circuit cells in the circuit design do not satisfy the predetermined criteria and/or constraints, thereby failing one or more of the coded rules. As an example, the predetermined criteria and/or constraints can be associated with a particular operating characteristic or environment in which the circuit end-product corresponding to the circuit design is to operate.

As an example, the circuit design validation tool 102 can evaluate each of the circuit cells of the circuit design netlist 112 based on a sequential application of the coded rules 106. As an example, the evaluation can be based on evaluation of the hierarchical layers of the circuit design netlist 112 in a sequence. In response to completion of the evaluation of the circuit design netlist 112, the circuit design validation tool 102 can provide a circuit evaluation report, demonstrated as validation report data, shown as "VRPT" in the example of FIG. 1, to the user interface 104. The circuit evaluation report VRPT is stored in a validation database 114 to facilitate user interaction with the circuit evaluation report VRPT. The circuit evaluation report VRPT can thus indicate a list of circuit cells in the circuit design netlist 112 that failed to satisfy specific coded rules 106, along with information regarding the failure (e.g., reasons for failure).

The coded rules 106 can be associated with a variety of operational, structural, and/or behavioral characteristics of the circuit cells of the circuit design netlist 112. As an example, the circuit design validation tool 102 can evaluate each instance of a circuit cell corresponding to each of a plurality of circuit cell templates stored in a circuit design library with respect to one or more of the coded rules 106. The circuit design library can be stored in the circuit design database 108, for example. As described in greater detail herein, the circuit cell templates in the circuit design library can include cell definitions that define operational, structural, and intended behavioral characteristics of the type of the circuit cells. Therefore, the coded rules 106 can correspond to rules defining consistency between a respective one of the circuit cell templates and each instance of the respective circuit cell with respect to the cell definitions.

As another example, the circuit design validation tool 102 can evaluate each of the instances of each of the circuit cell types with respect one or more additional coded rules. The instances of the circuit cells can each include a unique instance name, net names associated with input and output wire couplings associated with the respective instance, and connections of the wire couplings to other instances of other circuit cells. Therefore, the coded rules 106 can define standards associated with the instance name, the net names, and the connections for each of the instances of the given cell type. The circuit design validation tool 102 can thus determine which of the circuit cells satisfy the coded rules 106 and which of the circuit cells fail the coded rules 106 based on the characteristics of the circuit cells relative to the criteria defined by the coded rules 106.

For example, the user interface 104 can include a evaluate failure input for each of the logged coded rule failures of respective circuit cells. The evaluate failure input can provide a means for correction of the respective failed circuit cells, such as based on user inputs. For example, the correction of the failed circuit cell can occur based on correction data, shown as correction data feedback "CDFBK" in FIG. 1, provided from the user interface 104 to the circuit design database 108 to modify the circuit design. Therefore, the circuit design netlist 112 can be respectively modified via the CNL data to provide the correction to the circuit design. As an example, the changes to the circuit design can be viewed graphically by the user (e.g., via a graphical user interface (GUI) associated with the user interface 104) automatically in response to the correction provided by the CNL data in a feedback manner.

As an example, the user can provide the evaluate failure input associated with a specific failed circuit cell via the user interface 104 to immediately view the failed circuit cell in a graphical representation of the circuit design. Therefore, the user can provide manual inputs via the user interface 104 to correct the failed circuit cell to a passing condition that satisfies the respective one of the coded rules 106. As another example, the circuit design validation tool 102, upon indicating failure of circuit cell with respect to a given one of the coded rules 106, can provide a suggestion to the user via the evaluate failure input as to how the failed circuit cell can be corrected to a passing condition that satisfies the respective one of the coded rules 106. As yet another example, the evaluate failure input can activate an automatic correction feature of the circuit design validation tool 102, such that the circuit design validation tool 102 can automatically correct the circuit cell to a passing condition that satisfies the respective one of the coded rules 106 based on context associated with surrounding or similar circuit cells that satisfied the respective one of the coded rules 106.

The circuit design validation tool 102 can thus be implemented to provide a high degree of scrutiny of the circuit design to satisfy the desired criteria as established by the coded rules 106. Such a validation process can provide a significantly more accurate and more rapid review of a circuit design relative to manual review by a circuit designer. Thus, the circuit design validation tool 102 can mitigate human error that can result from time consuming and tedious manual review. Furthermore, in some examples, the circuit design validation tool 102 can obviate the need for manual circuit validation that simulates environmental conditions. For example, for validation of a radiation-hardened circuit design, the circuit design validation tool 102 can provide sufficient validation of the radiation-hardened design instead of providing particle accelerator testing that can be costly and not readily accessible.

Figure 2:
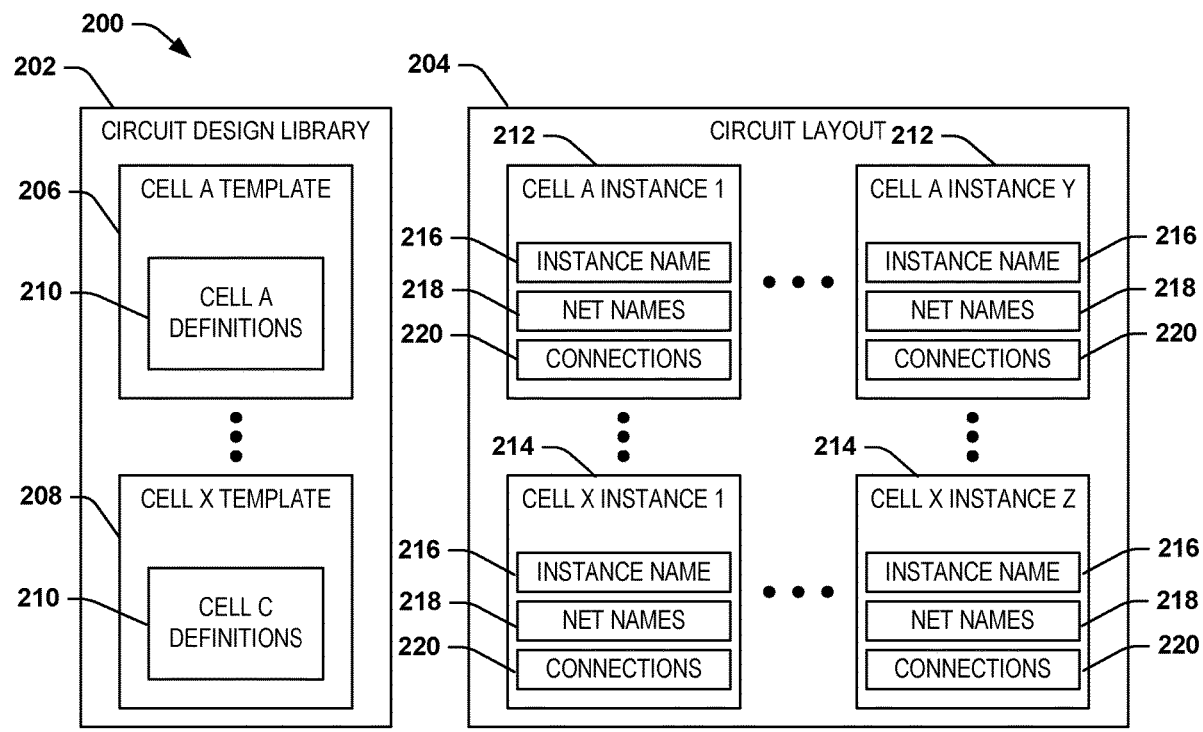
FIG. 2 is an example diagram of a circuit design.

FIG. 2 is an example diagram of a circuit design netlist 200. The circuit design netlist 200 is demonstrated diagrammatically to demonstrate functional components, and is not demonstrated to show the circuit topography in a traditional circuit diagram. Instead, the circuit design netlist 200 is intended to be representative of the circuit topography. The circuit design netlist 200 can correspond to the circuit design netlist 112 that is accessible from the circuit design database 108 via the circuit database API 110 in the example of FIG. 1. Therefore, reference is to be made to the example of FIG. 1 in the following description of the example of FIG. 2.

The circuit design netlist 200 includes a circuit design library 202 and a circuit layout 204. The circuit design library 202 includes a plurality of circuit cell templates that each correspond to types of circuit cells that can be implemented in the circuit design. In the example of FIG. 2, the circuit cell templates are demonstrated as a circuit cell A template ("CELL A TEMPLATE") 206 through a circuit cell X template ("CELL X TEMPLATE") 208, with a plurality of circuit cell templates therebetween, where X is an integer. Each of the circuit cell templates 206 through 208 (hereinafter corresponding to each of the A through X circuit cell templates) can thus correspond to a functional circuit block of circuit components, which can vary from a single circuit element to an entire functional subcircuit within the circuit design. Therefore, the circuit cell templates 206 through 208 can be implemented as hierarchical layers in the circuit design, as described in greater detail herein. In the example of FIG. 2, each of the circuit cell templates 206 through 208 includes corresponding circuit cell definitions 210 that define operational, structural, and/or intended behavioral characteristics (e.g., requiring a triple redundancy and/or majority vote topology or other radiation-hardened design considerations) of the type of the circuit cells represented by the respective one of the circuit cell templates 206 through 208. The circuit cell definitions 210 can thus define nomenclature standards, connectivity standards of input and output wires, and behavioral standards corresponding to an intended use of the circuit cells corresponding to the respective one of the circuit cell templates 206 through 208.

The circuit layout 204 can correspond to a text-based representation of the circuit topography of the circuit design. In the example of FIG. 2, the circuit layout 204 includes instances of the circuit cell templates 206, demonstrated as circuit cell instances. Thus, the circuit cell instances correspond to the circuit cells in the circuit design netlist 112 that are evaluated by the circuit design validation tool 102. As described herein, the terms "circuit cell of the circuit design or the circuit design netlist 112" and "circuit cell instance of the circuit layout 204" are used synonymously.

In the example of FIG. 2, the circuit layout 204 includes a plurality Y of circuit cell A instances 212, with a first circuit cell A instance ("CELL A INSTANCE 1") through a last (Yth) circuit cell A instance ("CELL A INSTANCE Y"), with a plurality of circuit cell A instances 212 therebetween, where Y is an integer. Each of the circuit cell A instances 212 corresponds to a respective single instance of the circuit cell A template 206. Similarly, the circuit layout 204 includes a plurality Z of circuit cell X instances 214, with a first circuit cell X instance ("CELL X INSTANCE 1") through a last (Zth) circuit cell X instance ("CELL X INSTANCE Z"), with a plurality of circuit cell X instances 214 therebetween, where Z is an integer. Each of the circuit cell X instances 214 corresponds to a respective single instance of the circuit cell X template 208. Each of the circuit cell templates between the circuit cell A templates 206 and the circuit cell X templates 208 can also include a plurality of instances of circuit cells in the circuit layout 204.

As described herein, alphabetic designations are not necessarily intended to be consistent with respect to quantity from one figure to another figure. Therefore, multiple instances of "N", "X", "Y", "Z", etc. are not necessarily denoting the same quantity or the same componentry in the description herein.

Each of the circuit cell instances 212 through 214 includes a unique instance name ("INSTANCE NAME") 216 corresponding to nomenclature of the circuit cell in the circuit design netlist 200, net names 218 corresponding to unique labels of the wires that connect as inputs and outputs to the respective circuit cell in the circuit design netlist 200, and connections 220 corresponding to the quantity, location, and other characteristics (e.g., gauge) of the wires that connect as inputs and outputs to the respective circuit cell in the circuit design netlist 200. The text-based representation of the circuit design netlist 200 based on the circuit cell instances 212 through 214, with the corresponding respective unique instance names 216, net names 218, and connections 220, as well as the circuit cell definitions 210 in the corresponding circuit cell templates 206 through 208, can thus correspond to the circuit design that is stored in the circuit design database 108.

As described above and as described in greater detail herein, the circuit design validation tool 102 can evaluate the circuit cell instances 212 through 214 with respect to the coded rules 106 to determine if the circuit cell instances 212 through 214 satisfy the predetermined criteria defined by the coded rules 106. As also described above, the predetermined criteria defined by the coded rules 106 can relate to requiring triple-redundancy for circuit components in the circuit design, with the triple-redundancy requiring a majority vote for the function of the respective circuit components.

As a first example, the circuit design validation tool 102 can evaluate the circuit cell instances 212 through 214 with respect to a first set of coded rules 106 to determine if each of the circuit cell instances 212 and 214 is provided in the circuit layout 204 consistent with the circuit cell definitions 210 of the corresponding respective circuit cell templates 206 through 208. For example, the circuit design validation tool 102 can determine if each of the circuit cell A instances 212 satisfy the circuit cell definitions 210 of the circuit cell A template 206, such as with respect to nomenclature standards, wire connectivity standards of input and output wires (e.g., quantity, type of connection to other circuit cell instances, etc.), and behavioral standards (providing the function in the circuit layout 204 that the circuit cell A template 206 is intended to provide) as set forth in the first set of coded rules 106. If a given one or more of the circuit cell A instances 212 are not consistent with the circuit cell definitions 210 of the circuit cell A template 206, as defined by the first set of coded rules 106, then the circuit design validation tool 102 marks the respective one or more of the circuit cell A instances 212 as having failed the specific respective coded rules 106 in the circuit evaluation report VRPT.

As a second example, the circuit design validation tool 102 can evaluate the circuit cell instances 212 through 214 with respect to a second set of coded rules 106 to determine if each of the circuit cell instances 212 and 214 is provided in the circuit layout 204 satisfy criteria defined by the second set of coded rules 106 with respect to the unique instance names 216, the net names 218, and the connections 220. For example, the circuit design validation tool 102 can determine if each of the circuit cell A instances 212 have unique instance names 216 that satisfy the definitions set forth in the second set of coded rules 106. The circuit design validation tool 102 can also determine if each of the circuit cell A instances 212 have net names 218 that satisfy the definitions set forth in the second set of coded rules 106. The circuit design validation tool 102 can further determine if the connections 220 between the circuit cell A instances 212 and other circuit cell instances satisfy a set of rules (e.g., connection between devices, ground connections, triplicate connection for triple-redundancy, etc.) defined by the second set of coded rules 106. If a given one or more of the circuit cell A instances 212 do not satisfy the rules defined by the second set of coded rules 106 with respect to the unique instance names 216, the net names 218, and the connections 220, then the circuit design validation tool 102 marks the respective one or more of the circuit cell A instances 212 as having failed the specific respective coded rules 106 in the circuit evaluation report VRPT.

Figure 3:
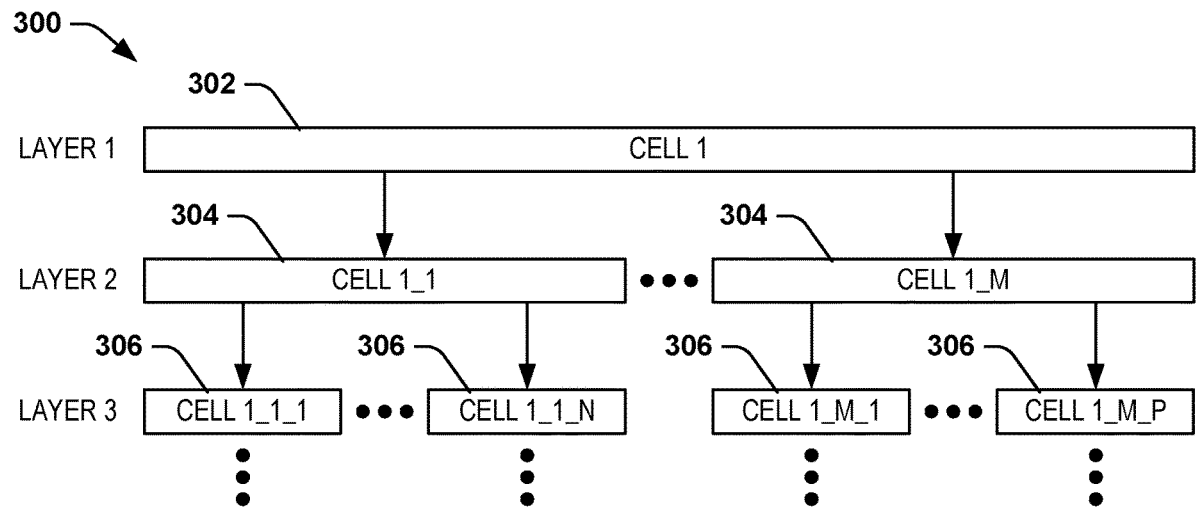
FIG. 3 is an example diagram of circuit cell hierarchy.

Referring back to the example of FIG. 1, as described herein, the circuit design validation tool 102 can initially evaluate each of the circuit cells of the circuit design netlist 112 initially. However, the circuit design validation tool 102 may not be able to determine whether a given circuit cell satisfies a given one of the coded rules 106 based on an individual evaluation, but may instead require additional context. For example, because some of the circuit cells of the circuit design netlist 112 subsume FIG. 3 is an example diagram 300 of circuit cell hierarchy. The diagram 300 is representative of the hierarchical structure of the circuit design, and is demonstrated in the example of FIG. 3 to provide context for the arrangement of circuit cells within circuit cells. The diagram 300 demonstrates multiple layers of a portion of the circuit design, demonstrated as "LAYER 1", "LAYER 2", and "LAYER 3". Additional layers above LAYER 1 or below LAYER 3 are possible for purposes of the circuit design. Therefore, the hierarchical arrangement of the circuit design can be extended in greater or lesser groupings of circuit cells.

In the example of FIG. 3, a first circuit cell 302, labeled "CELL 1", is arranged on LAYER 1. The first circuit cell 302 can correspond to a functional block of circuit components that collectively correspond to a large subcircuit of the circuit design. As an example, the first circuit cell 302 can correspond to one of the circuit cell instances 212 through 214 of a circuit cell type that is represented by one of the circuit cell templates 206 through 208 in the circuit design library 202, and can thus be a part of the circuit layout 204. Therefore, the circuit cell template corresponding to the first circuit cell 302 can have circuit cell definitions 210 that the first circuit cell 302 is intended to satisfy, and the first circuit cell 302 can include a unique instance name 216, net names 218, and connections 220.

In the example of FIG. 3, the first circuit cell 302 includes a plurality M of second circuit cells 304 in LAYER 2, where M is an integer. In the example of FIG. 3, the second circuit cells 304 are labeled "CELL 1_1" through "CELL 1_M". The second circuit cells 304 are therefore subsumed by the first circuit cell 302, and therefore correspond to subcircuits of the circuit corresponding to the first circuit cell 302. Each of the second circuit cells 304 includes a plurality of third circuit cells 306 in LAYER 3. In the example of FIG. 3, the second circuit cell 304 labeled "CELL 1_1" includes a plurality N of third circuit cells, where N is an integer, labeled "CELL 1_1_1" through "CELL 1_1_N". Similarly, the second circuit cell 304 labeled "CELL 1_M" includes a plurality P of third circuit cells, where P is an integer, labeled "CELL 1_M_1" through "CELL 1_M_P". Each set of the third circuit cells 306 are therefore subsumed by one of the second circuit cells 304, and therefore correspond to subcircuits of the circuit corresponding to the respective one of the second circuit cells 304. As described above, the circuit design can include additional layers in the hierarchical arrangement, such that each of the third circuit cells 306 can include a respective plurality of circuit cells as subcircuits thereof.

The circuit design validation tool 102 can be configured to evaluate the layers of the hierarchical arrangement of the circuit design individually, collectively, or sequentially. As an example, each of the coded rules 106 can be programmed to apply to one or more of the layers specifically, or can include details as to how to evaluate the circuit design netlist 112 across multiple layers. As an example, the evaluation of layers in a sequence can be necessary to gain context of surrounding portions of the circuit design for purposes of evaluating a given one circuit cell based on a specific one of the coded rules 106.

For example, in evaluating LAYER 3 based on a given one of the coded rules 106, the circuit design validation tool 102 may not be able to determine if a given one of the third circuit cells 306 (e.g., CELL 1_1_1) passes or fails the given one of the coded rules 106 without more information. Therefore, the circuit design validation tool 102 can store the unresolved evaluation regarding the respective third circuit cell 306 with respect to the one of the coded rules 106 in a buffer to be determined at a later time. Thus, in order to ascertain additional context or information that can provide the determination of the unresolved evaluation, the circuit design validation tool 102 can evaluate the respective one of the second circuit cells 304 that subsumes the respective third circuit cell 306 in the next higher layer (e.g., CELL 1_1) based on the respective one of the coded rules 106 or based on a different one of the coded rules 106 to gain additional information. If the additional information is sufficient, the circuit design validation tool 102 can thus provide re-evaluation of the respective one of the third circuit cells 306 with respect to the one of the coded rules 106 based on the additional information to determine if the respective one of the third circuit cells 306 passes or fails the conditions defined by the respective one of the coded rules 106.

In the example provided above, the additional information to re-evaluate an unresolved evaluation of a circuit cell can be gathered in a variety of ways. The circuit design validation tool 102 can gather the additional information based on evaluating surrounding circuit cells (e.g., as determined by the connections 220) based on the same or a different one of the coded rules 106, based on evaluating the circuit cell of a next higher layer or circuit cells of a next lower layer of the hierarchical arrangement of the circuit design, or based on obtaining information in a certain order that is different from the order of applying the coded rules 106 in evaluating the circuit design netlist 112. As another example, one or more of the coded rules 106 can be directed to consistency in the characteristics of the circuit cells across one or more of the layers of the hierarchical arrangement of the circuit design. For example, one or more of the coded rules 106 can be directed to consistency in the unique instance names 216, the net names 218, and the connections 220 of the first circuit cell 302 relative to the second circuit cells 304, and/or the third circuit cells 306.

Figure 4:
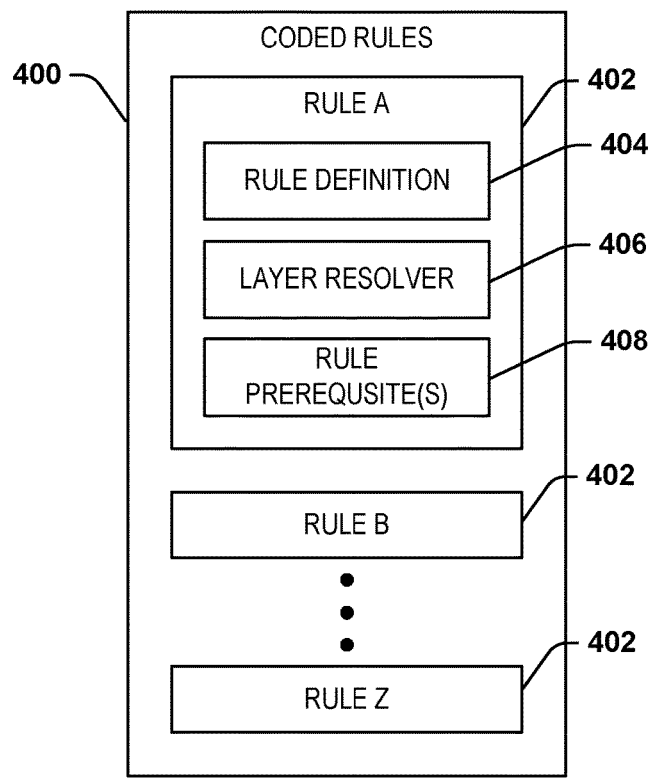
FIG. 4 is an example diagram of a set of coded rules.

FIG. 4 is an example diagram of a set of coded rules 400. The set of coded rules 400 can correspond to a collection of program subroutines, code files, a memory that stores the coded rules, or any of a variety of other data structures that correspond to the coded rules 106. The set of coded rules 400 thus includes a plurality Z of coded rules 402 with which the circuit design validation tool 102 can evaluate the circuit design netlist 112. The coded rules 402 can collectively be directed to defining constraints and considerations for ensuring that the circuit design is radiation-hardened.

Each of the coded rules 402 can include a rule definition 404, a layer resolver 406, and one or more rule prerequisites 408. The rule definition 404 can correspond to the definition of the rule, as applied to one or more of the circuit cells, to determine if the respective circuit cell(s) pass or fail the conditions set forth by the definition. The layer resolver 406 can correspond to the behavior or manner of evaluation of the coded rule 402 with respect to the hierarchical structure of the circuit design. As an example, the layer resolver 406 can define that the coded rule 402 operates on only a specific one or more of the layers of the circuit design. As another example, the layer resolver 406 can determine how the circuit design validation tool 102 should apply the coded rule 402 in response to an unresolved evaluation of a given circuit cell on a given layer. For example, as described above in the example of FIG. 3, the layer resolver 406 can define that the coded rule 402 should be applied to a given circuit cell, and if the circuit design validation tool 102 cannot determine if the respective circuit cell passes or fails the given coded rule 402, the layer resolver 406 can dictate that the circuit design validation tool 102 should evaluate the circuit cell(s) in the next higher or lower layers to determine if the additional information can be ascertained for determining satisfaction of the respective coded rule 402.

The rule prerequisite(s) 408 can correspond to one or more conditions as to when the apply the respective coded rule 402, conditions that trigger application of the respective coded rule 402, an order of application of the respective coded rule 402, or any of a variety of factors that dictate when and how the respective coded rule 402 should be applied to the respective circuit cells. For example, the rule prerequisite(s) 408 can determine when or what additional information may be needed for resolving the respective coded rule 402, such that the rule prerequisite(s) 408 can dictate the conditions that the unresolved evaluation of a given circuit cell should be stored in a buffer for re-evaluation at a later time based on additional information or context provided by the evaluation of other circuit cells in the circuit design. The rule prerequisite(s) 408 can also dictate what information specifically may be required for resolving the respective coded rule 402 in evaluating a given circuit cell, such that the required information requirements can be stored in a memory. Therefore, upon the circuit design validation tool 102 gathering the required information either before or after evaluating the circuit cells based on the respective coded rule 402, the circuit design validation tool 102 can flag the rule prerequisite(s) 408 as being met to subsequently evaluate circuit cells with respect to the specific coded rule 402, or to re-evaluate a circuit cell that had been previously buffered as having an unresolved evaluation based on incomplete information at an initial time of evaluation.

Below are several examples of coded rules 402 that are collectively associated with ensuring that the circuit design is radiation-hardened.

As a first example, one of the coded rules 402 can correspond to floating nets for triple-redundancy. The coded rule 402 can check that if triple-redundancy nets are produced then they are all used. Using a single leg of a triple-redundancy net can cause a variety of issues. The coded rule 402 can generate a derivative rule to check connections at higher levels for nets that connect to module terminals (ports). Thus, the coded rule 402 can ensure that the nets connect at an input/output port of the circuit cell. The coded rule 402 can check at a higher level for nets that connect up via a port.

As a second example, one of the coded rules 402 can correspond to ensuring that all input nets on an instance of a circuit cell are or are not triple-redundant. The coded rule 402 can exclude power and ground nets. If an input net is triple-redundant, then the coded rule 402 ensures that all input nets are triple-redundant. An exception can be established for majority voted or majority voted filtered nets. If all nets of a circuit cell are triple-redundant or majority voted, or a filtered net, the coded rule 402 passes. When all nets of a circuit cell are non-triple-redundant, the coded rule 402 passes. If a circuit cell includes both triple-redundant and non-triple-redundant nets, the coded rule 402 fails. Net inputs that are not labeled triple-redundant, majority voted, or filtered, and are hooked to a module port, the coded rule 402 will facilitate checking at a next higher level of the circuit design.

As a third example, one of the coded rules 402 can define that majority vote instances of circuit cells should have majority vote output nets. If the instance of a circuit cell has a majority vote suffix, then the outputs of the circuit cell should have a majority vote suffix. If the instance of the circuit cell has a majority vote filtered suffix, then the outputs of the circuit cell should have a majority vote filtered suffix.

As a fourth example, one of the coded rules 402 can define that filtered instances of circuit cells are required to not have triple-redundant fast input nets. If the instance of the circuit cell has a filtered or majority vote filtered suffix, then the inputs of the circuit cell should not be indicated with a triple redundant fast suffix.

As a fifth example, one of the coded rules 402 can define that triple-redundant net numbers/order match triple-redundant instance numbers.

As a sixth example, one of the coded rules 402 can define that a triple-redundant instance of a circuit cell should have an index indicator that is either an array or a scalar number.

As a seventh example, one of the coded rules 402 can define that triple-redundant nets should have the same number of load connections.

As an eighth example, one of the coded rules 402 can define that triple-redundant nets should be in groups of three. Other quantities of triple-redundant labeled nets will be flagged as failing.

As a ninth example, one of the coded rules 402 can define that memory elements should have majority voted inputs.

As a tenth example, one of the coded rules 402 can define that instances of circuit cells that appear to be triple redundant should have the triple-redundant naming convention. The coded rule 402 identifies such instances of circuit cells by finding circuit cell templates that are instantiated exactly three times in a schematic and have all of the respective ports connected to net names with the same name or the same root name.

As an eleventh example, one of the coded rules 402 can define that nets that appear to be triple redundant should have the triple-redundant naming convention. The coded rule 402 identifies the nets by finding nets with a common root name (e.g., with net array index removed) that are three in quantity in a schematic and are connected to the same combination of ports of the same instances of a circuit cell template.

As a twelfth example, one of the coded rules 402 can define that instances of circuit cells that have been named with a memory suffix should appear in the configuration file for defined circuit cell templates of valid memory cells.

As a thirteenth example, one of the coded rules 402 can define that instances of circuit cells that have been named with memory filtered suffix should appear in the configuration file for defined circuit cell templates of valid memory cells with embedded filters.

As a fourteenth example, one of the coded rules 402 can define that instances of circuit cells should match the defined circuit cell template for memory cells, but do not have a memory cell naming suffix.

As a fifteenth example, one of the coded rules 402 can define that instances of circuit cells that match to the defined circuit cell template for memory cells with embedded filters should a memory cell with filter naming suffix.

As a sixteenth example, one of the coded rules 402 can define that comparators that are not named with a safe (e.g., triple-redundant, majority vote, and/or filtered) extension that are not in a triple-redundant cell and which have loads do not go to a safe port/instance. The coded rule 402 will flag failure if the instance of the circuit cell is not named with a safe suffix and the loads and parent cell are also not named with a safe suffix.

As a seventeenth example, one of the coded rules 402 can define that nets should not have name changes between triple-redundant and triple-redundant fast throughout the hierarchy of the circuit design.

As an eighteenth example, one of the coded rules 402 can check for instances of circuit cells of level shifters as defined in a configuration file. If the level-shifter circuit cells have safe extensions, then the level-shifter circuit cells should have safe inputs. If a safe level shifter instance of a circuit cell is found, the inputs are checked to make sure the input nets are safe. If an input net is not labeled as safe, and is a port, the nets in the layer above are checked.

As a nineteenth example, one of the coded rules 402 can checks that the body terminal of isolated transistor devices (e.g., ISO NMOS devices) are tied to a ground net.

As a twentieth example, one of the coded rules 402 can check that the body terminal of transistor devices (e.g., PMOS devices) are tied to a supply net.

As a twenty-first example, one of the coded rules 402 can check that the bottom plate of high-density capacitors is tied to a supply or ground net.

As a twenty-second example, one of the coded rules 402 can check that one of the terminals of capacitors (e.g., the BN terminal of multi-layer polysilicon capacitors) are tied to a supply or ground net.

As a twenty-third example, one of the coded rules 402 can check that the body terminal of a 20V laterally-diffused transistor (LDMOS) is tied to the source terminal.

As a twenty-fourth example, one of the coded rules 402 can identify simple NAND or NOR based SR latches which are not contained inside a defined memory cell. The topology recognition of the coded rule 402 can see through any resistors that may be part of RC filters. If such devices are found, the latch is checked to determine if it is inside a defined MEM hierarchy so that all the other triple redundant rule checking can be performed.

As a twenty-fifth example, one of the coded rules 402 can identify NMOS spares that are tied off to a supply net.

As a twenty-sixth example, one of the coded rules 402 can provide a general analog linting check not specifically related to triple-redundant circuits. The coded rule 402 attempts to identify places where a bias current net output was shared between two or more blocks.

Additional examples of coded rules 402 can be implemented to ensure that the circuit design is radiation-hardened. Therefore, the coded rules 402 are not limited to the examples described herein.

FIG. 5 is an example diagram of a circuit cell template 500. The circuit cell template 500 can correspond to one of the circuit cell templates 206 through 208 in the example of FIG. 2, such that the circuit cell template 500 can be stored in the circuit design library 202. Therefore, reference is to be made to the example of FIG. 2 in the following example of FIG. 5.

The circuit cell template 500 includes corresponding circuit cell definitions 502. Similar to as described above, the circuit cell definitions 502 can define operational, structural, and/or intended behavioral characteristics (e.g., requiring a triple redundancy and/or majority vote topology or other radiation-hardened design considerations) of the type of the circuit cells represented by the circuit cell template 500. The circuit cell definitions 502 can thus define nomenclature standards, connectivity standards of input and output wires, and behavioral standards corresponding to an intended use of the circuit cells corresponding to the circuit cell template 500.

In addition, in the example of FIG. 5, the circuit cell template 500 includes a configuration file 504 that can include data about interaction of the instances of the circuit cell template 500 in the circuit design. The interactions can be dictated by one or more coded rules 106, such as to ensure a radiation-hardened design. Therefore, in the example of FIG. 5, the configuration file 504 includes a circuit cell rule 506 that can be specific about characteristics or requirements of instances of the circuit cell template 500 in the circuit design. Therefore, the circuit cell rule 506 can correspond to one of the coded rules 106 that can be specific to the circuit cell template 500, and thus all instances of the circuit cell template 500 in the circuit design.

As an example, the circuit cell rule 506 can be provided to a set of coded rules 508 that can correspond to the coded rules 400 in the example of FIG. 4. As an example, the circuit design validation tool 102 can access the configuration file 504 from the circuit design netlist 112 during initial access of the circuit design netlist 112 prior to evaluation of the circuit design. Therefore, the circuit design validation tool 102 can add the circuit cell rule 506 to the coded rules 106 prior to evaluating the circuit design netlist 112 with respect to the coded rules 106. As another example, the circuit design validation tool 102 can add the circuit cell rule 506 to the coded rules 106 during evaluation of the circuit design netlist 112. For example, the circuit design validation tool 102 can identify an instance of the circuit cell template 500 in the circuit design netlist 112 during the evaluation with respect to one or more of the coded rules 106. Upon identifying the instance of the circuit cell template 500, the circuit design validation tool 102 can access the circuit cell rule 506 from the configuration file 504 to evaluate the instance of the circuit cell template 500 immediately or at a later time. The circuit design validation tool 102 can thus apply the circuit cell rule 506 upon identifying every instance of the circuit cell template 500 thereafter. As an example, the circuit cell rule 506 can augment, modify, or obviate other coded rules 106, such that the evaluation of the circuit design netlist 112 can change based on accessing the circuit cell rule 506.

FIG. 6 is an example diagram of a circuit evaluation report 600. The circuit evaluation report 600 can correspond to the circuit evaluation report VRPT provided from the circuit design validation tool 102 to the user interface 104. Therefore, a user can view (e.g., via a GUI of the user interface 104) and interact with the circuit evaluation report 600.

In the example of FIG. 6, the circuit evaluation report 600 includes a numerical list of identified circuit cells that failed specific coded rules 106. The circuit evaluation report 600 includes an index of the identified failed circuit cells, demonstrated at 602 and numbering a quantity N, which is an integer. The circuit evaluation report 600 is not limited to only demonstrating failures, but can instead provide an entire list of the status of each circuit cell with respect to each of the coded rules 106, and can allow for toggling between viewing options based on the user interface 104. The circuit evaluation report 600 also includes an indication of the failed circuit cells at 604. Each failure indication 604 corresponds to a specific index number and identifies a specific one of the circuit cells that failed. The circuit evaluation report 600 also provides an indication of the coded rule which the specific circuit cell of the index number failed, demonstrated at 606, and the reasons for the respective failure at 608. The failure reasons 608 of the given circuit cell by the respective coded rule can thus be reviewed by the user to determine what aspects of the circuit cell resulted in a violation of the definitions of the respective coded rule. Accordingly, the user can implement the failure reasons 608 for troubleshooting the circuit design.

In the example of FIG. 6, the circuit evaluation report 600 further includes an evaluate failure input 610 associated with each of the indices, and thus for each of the identified failures. The evaluate failure input 610 can provide a means for correction of the respective failed circuit cells, such as based on user inputs provided via the user interface 104. As an example, by initiating a evaluate failure input 610, the circuit design validation tool 102 can access the specific circuit cell that failed the respective coded rule 106 and display the circuit cell graphically on the user interface 104. The user can therefore provide a manual correction of the failed circuit cell, which can update the circuit design in the circuit design database 108. Therefore, the circuit design netlist 112 can be automatically modified. Thus, the circuit design validation tool 102 can automatically provide the corrected circuit cell graphically to the user on the user interface 104 in a feedback manner. Alternatively, the user can decide, based on viewing the graphical representation of the failed circuit cell, that the failure is acceptable or mistaken, and can flag the logged failure with a passing result.

As another example, in response to providing the evaluate failure input 610, the circuit design validation tool 102 can provide a suggestion to the user via the user interface 104 as to how the failed circuit cell can be corrected to a passing condition that satisfies the respective one of the coded rules 106. For example, the circuit design validation tool 102 can generate the suggested modification to the circuit cell based on contextual information regarding surrounding circuit cells and/or nets connected to the respective circuit cell, such as based on the evaluation of the respective circuit cell and/or surrounding circuit cells. The user can thus accept the suggestion, resulting in an automatic correction of the failed circuit cell, override the suggestion with manual inputs to correct the failed circuit cell, or ignore the failure and mark the respective circuit cell as passing via the user interface 104. As yet another example, the evaluate failure input 610 can be initiated by the user to activate an automatic correction feature of the circuit design validation tool 102. Therefore, similar to the suggested modification described above, the circuit design validation tool 102 can automatically correct the circuit cell to a passing condition that satisfies the respective one of the coded rules 106 based on context associated with surrounding or similar circuit cells that satisfied the respective one of the coded rules 106. Accordingly, the circuit design can be corrected in a variety of ways by the evaluate failure input 610 to satisfy the requirements of a radiation-hardened design.

As described herein, the circuit design validation tool 102 can provide a rapid solution to validating a circuit design to ensure radiation-hardened design considerations. As a result, significant time in manual review and validation can be saved, and the potential for human error resulting from such time-consuming and menial review can be greatly mitigated. Furthermore, the use of the circuit design validation tool 102 can mitigate the need for manual testing protocols to ensure a properly functioning radiation-hardened design. For example, the circuit design validation tool 102 can obviate the need to use a particle accelerator to test actual hardware fabrications of a circuit design. The use of such a particle accelerator is extremely expensive and very difficult to access. Therefore, eliminating such a requirement can result in significant time and cost reduction.

Figure 7:
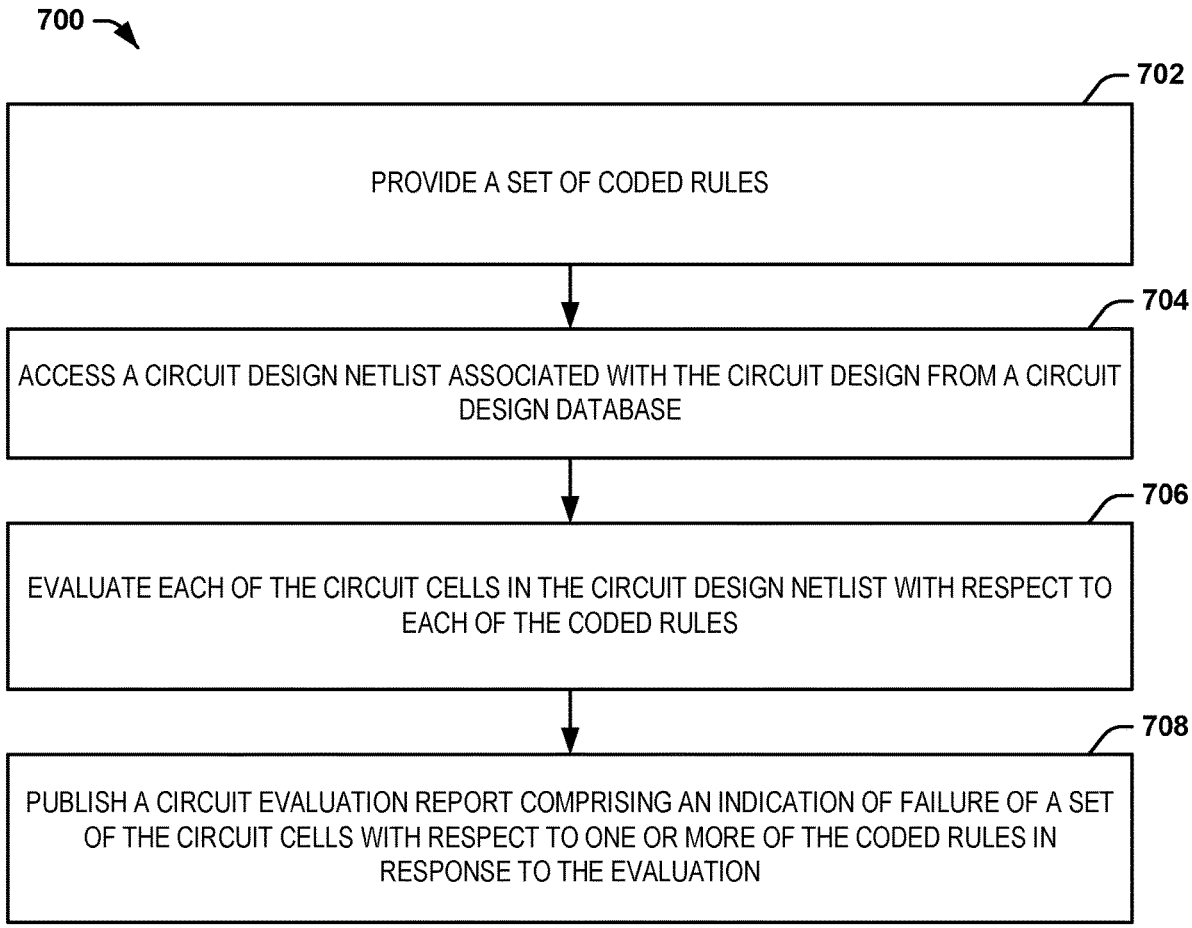
FIG. 7 is an example diagram of a method for validating a circuit design.

In view of the foregoing structural and functional features described above, a methodology in accordance with various aspects of the present invention will be better appreciated with reference to FIG. 7. While, for purposes of simplicity of explanation, the methodology of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 7 illustrates an example of a method 700 for method for validating a circuit design. At 702, a set of coded rules (e.g., the coded rules 106) is provided. Each of the coded rules can define conditions for circuit cells (e.g., the circuit cell instances 212 through 214) to qualify the circuit design as being radiation-hardened. At 704, a circuit design netlist (e.g., the circuit design netlist 112) associated with the circuit design is accessed from a circuit design database (e.g., the circuit design database 108). At 706, each of the circuit cells in the circuit design netlist is evaluated with respect to each of the coded rules. At 708, a circuit evaluation report (e.g., the circuit evaluation report 600) comprising an indication of failure of a set of the circuit cells with respect to one or more of the coded rules is provided in response to the evaluation.

In this description, the term "couple" may cover connections, communications, or signal paths that enable a functional relationship consistent with this description. For example, if device A generates a signal to control device B to perform an action, then: (a) in a first example, device A is directly coupled to device B; or (b) in a second example, device A is indirectly coupled to device B through intervening component C if intervening component C does not substantially alter the functional relationship between device A and device B, so device B is controlled by device A via the control signal generated by device A.

Also, in this description, a device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device described herein as including certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor wafer and/or integrated circuit (IC) package) and may be configured to couple to at least some of the passive elements and/or the sources to form the described structure, either at a time of manufacture or after a time of manufacture, such as by an end user and/or a third party.

Modifications are possible in the described embodiments, and other embodiments are possible, within the scope of the claims.

What is claimed is:

1. A method for validating a circuit design, the method comprising:
   providing a set of coded rules, each of the coded rules defining conditions for circuit cells to qualify the circuit design as being radiation-hardened;
   accessing a circuit design netlist associated with the circuit design from a circuit design database;
   evaluating each of the circuit cells in the circuit design netlist with respect to each of the coded rules; and
   publishing a circuit evaluation report comprising an indication of failure of a set of the circuit cells with respect to one or more of the coded rules in response to the evaluation.

2. The method of claim 1, wherein publishing the circuit evaluation report comprises publishing the circuit evaluation report to a validation database on a user interface, the method further comprising providing a evaluate failure input on the validation database to correct a failure of each of the set of circuit cells in the circuit evaluation report.

3. The method of claim 2, wherein the evaluate failure input is configured to modify a respective one of the set of circuit cells in the circuit design netlist indicated as failed in the circuit evaluation report to change the respective one of the set of circuit cells as passing in the circuit evaluation report.

4. The method of claim 1, wherein accessing the circuit design netlist comprises accessing the circuit design netlist from a circuit database application programming interface (API) associated with the circuit design database.

5. The method of claim 1, wherein evaluating each of the circuit cells comprises evaluating each instance of a circuit cell corresponding to each of a plurality of circuit cell templates stored in a circuit design library with respect to at least one of the coded rules,
   wherein each of the circuit cell templates comprises cell definitions that define operational, structural, and intended behavioral characteristics of the respective type of the circuit cells, and
   wherein the at least one of the coded rules corresponds to consistency between a respective one of the circuit cell templates and each instance of the respective circuit cell with respect to the cell definitions.

6. The method of claim 5, further comprising storing a configuration file in one of the circuit cell templates, the configuration file comprising a respective first one of the coded rules of the respective one of the circuit cell templates, wherein storing the set of coded rules comprises storing the respective coded rule from the configuration file in response to evaluating an instance of a respective circuit cell corresponding to the respective one of the circuit cell templates with respect to a second one of the coded rules, and wherein evaluating each of the circuit cells further comprises evaluating each instance of the one of the circuit cell templates with respect to the first one of the coded rules.

7. The method of claim 1, wherein evaluating each of the circuit cells comprises evaluating each of a plurality of instances of each of a plurality of circuit cell types with respect to at least one of the coded rules, wherein each of the instances comprises a unique instance name, net names associated with input and output wire couplings associated with the respective instances, and connections of the input and output wire couplings to other respective instances of circuit cells, wherein the at least one of the coded rules corresponds to defining a standard associated with the instance name, the net names, and the connections for each of the instances.

8. The method of claim 1, wherein evaluating each of the circuit cells further comprises:
   storing an unresolved evaluation a first one of the circuit cells in response to a determination of incomplete information associated with evaluation of the first one of the circuit cells with respect to a first one of the coded rules;
   evaluating at least one other of the circuit cells with respect to at least one of the first one of the coded rules and another one of the coded rules to determine additional evaluation information; and
   re-evaluating the first one of the circuit cells with respect to the first one of the coded rules based on the additional evaluation information.

9. The method of claim 1, wherein evaluating each of the circuit cells comprises evaluating each of a plurality of hierarchical layers of the circuit cells with respect to at least one of the coded rules, the hierarchical layers comprising a top layer, at least one intermediate layer, and a bottom layer, wherein each of the top layer and the at least one intermediate layer comprises at least one higher level circuit cell that comprises a plurality of lower level circuit layers associated with a next lower layer of the hierarchical layers, wherein the at least one of the coded rules corresponds to at least one of name and connection consistency between the at least one higher level circuit cell and the lower level circuit layers.

10. The method of claim 9, wherein evaluating each of the circuit cells further comprises:
    evaluating a respective one of the at least one higher level circuit cell in response to a determination of incomplete information associated with evaluation of the lower level circuit cells with respect to the at least one of the coded rules; and
    re-evaluating the lower level circuit cells with respect to the at least one of the coded rules based on the evaluation of the at least one higher level circuit cell.

11. The method of claim 9, wherein, for each of the coded rules, storing the coded rules comprises:
    storing a rule definition defining passage and failure conditions for the circuit cells for the respective one of the coded rules;
    storing at least one prerequisite for the respective one of the coded rules associated with an order of evaluating the respective one of the coded rules with respect to at least one other coded rule; and
    storing a layer resolver for the respective one of the coded rules that defines a manner of the evaluation of the respective one of the coded rules with respect to the hierarchical layers.

12. The method of claim 1, wherein evaluating each of the circuit cells comprises evaluating each of the circuit cells in the circuit design netlist with respect to each of the coded rules associated with providing triple-redundancy majority voter design considerations for the circuit design to qualify as radiation-hardened.

13. A circuit validation system comprising:
    a user interface configured to facilitate input of a set of coded rules, each of the coded rules defining conditions for circuit cells to qualify the circuit design as being radiation-hardened;
    a circuit database application programming interface (API) configured to provide access to a circuit design netlist associated with the circuit design from a circuit design database; and a circuit design validation tool configured to access the circuit design netlist via the circuit database API and to evaluate each of the circuit cells in the circuit design netlist with respect to each of the coded rules and to provide a circuit evaluation report to a validation database on the user interface, the circuit evaluation report comprising an indication of failure of a set of the circuit cells with respect to one or more of the coded rules in response to the evaluation.

14. The system of claim 13, wherein the user interface further comprises providing an evaluate failure input on the validation database, the evaluate failure input being configured to modify a respective one of the set of circuit cells in the circuit design netlist indicated as failed in the circuit evaluation report to correct a failure of the respective one of the set of circuit cells to change the respective one of the set of circuit cells as passing in the circuit evaluation report.

15. The system of claim 13, wherein the circuit design validation tool is further configured to evaluate each instance of a circuit cell corresponding to each of a plurality of circuit cell templates stored in a circuit design library with respect to at least one of the coded rules, wherein each of the circuit cell templates comprises cell definitions that define operational, structural, and intended behavioral characteristics of the type of the circuit cells, wherein the at least one of the coded rules corresponds to consistency between a respective one of the circuit cell templates and each instance of the respective circuit cell with respect to the cell definitions.

16. The system of claim 13, wherein the circuit design validation tool is further configured to each of a plurality of instances of each of a plurality of circuit cell types with respect to at least one of the coded rules, wherein each of the instances comprises a unique instance name, net names associated with input and output wire couplings associated with the respective instances, and connections of the input and output wire couplings to other respective instances of circuit cells, wherein the at least one of the coded rules corresponds to defining a standard associated with the instance name, the net names, and the connections for each of the instances.

17. The system of claim 13, wherein the circuit design validation tool is further configured to:
store an unresolved evaluation a first one of the circuit cells in response to a determination of incomplete information associated with evaluation of the first one of the circuit cells with respect to a first one of the coded rules;
evaluate at least one other of the circuit cells with respect to at least one of the first one of the coded rules and another one of the coded rules to determine additional evaluation information; and
re-evaluate the first one of the circuit cells with respect to the first one of the coded rules based on the additional evaluation information.

18. The system of claim 13, wherein the circuit design validation tool is further configured to evaluate each of a plurality of hierarchical layers of the circuit cells with respect to at least one of the coded rules, the hierarchical layers comprising a top layer, at least one intermediate layer, and a bottom layer, wherein each of the top layer and the at least one intermediate layer comprises at least one higher level circuit cell that comprises a plurality of lower level circuit layers associated with a next lower layer of the hierarchical layers, wherein the at least one of the coded rules corresponds to at least one of name and connection consistency between the at least one higher level circuit cell and the lower level circuit layers.

19. A non-transitory computer readable medium embedded thereon a circuit design validation tool, which when executed by a processor, configures the processor to:
receive a set of coded rules, each of the coded rules defining conditions for circuit cells to qualify the circuit design as being radiation-hardened;
access a circuit design netlist associated with the circuit design via a circuit database application programming interface (API) associated with a circuit design database;
evaluate each of the circuit cells in the circuit design netlist with respect to each of the coded rules; and
provide a circuit evaluation report to a validation database on the user interface, the circuit evaluation report comprising an indication of failure of a set of the circuit cells with respect to one or more of the coded rules in response to the evaluation.

20. The non-transitory computer readable medium of claim 19, wherein the circuit design validation tool is wherein the circuit design validation tool isfurther configured to:
evaluate each instance of a circuit cell corresponding to each of a plurality of circuit cell templates stored in a circuit design library with respect to at least one first coded rule, wherein each of the circuit cell templates comprises cell definitions that define operational, structural, and intended behavioral characteristics of the type of the circuit cells, wherein the at least one first coded rule corresponds to consistency between a respective one of the circuit cell templates and each of a plurality of instances of the respective circuit cell with respect to the cell definitions; and
evaluate each of the plurality of instances of each of the plurality of circuit cell types with respect to at least one second coded rule, wherein each of the instances comprises a unique instance name, net names associated with input and output wire couplings associated with the respective instantiation, and connections of the input and output wire couplings to other respective instances of circuit cells, wherein the at least one second coded rule corresponds to defining a standard associated with the instance name, the net names, and the connections for each of the instances.

\* \* \* \* \*